United States Patent
Cudak et al.

(10) Patent No.: US 10,116,594 B2
(45) Date of Patent: Oct. 30, 2018

(54) PROVISIONING OF A SERVER USING A VIRTUAL LOCAL AREA NETWORK

(71) Applicant: Lenovo Enterprise Solutions (Singapore) Pte. Ltd., Singapore (SG)

(72) Inventors: Gary D. Cudak, Wake Forest, NC (US); Fred A. Bower, III, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 6 days.

(21) Appl. No.: 15/370,494

(22) Filed: Dec. 6, 2016

(65) Prior Publication Data
US 2018/0159797 A1    Jun. 7, 2018

(51) Int. Cl.
| | |
|---|---|
| *H04L 12/947* | (2013.01) |
| *H04L 12/46* | (2006.01) |
| *H04L 12/911* | (2013.01) |
| *H04L 29/08* | (2006.01) |
| *H04L 12/24* | (2006.01) |
| *H04L 12/933* | (2013.01) |

(52) U.S. Cl.
CPC .......... *H04L 49/25* (2013.01); *H04L 12/4641* (2013.01); *H04L 41/0806* (2013.01); *H04L 41/28* (2013.01); *H04L 47/70* (2013.01); *H04L 49/15* (2013.01); *H04L 67/28* (2013.01)

(58) Field of Classification Search
CPC ..... H04L 49/25; H04L 12/4641; H04L 47/70; H04L 67/28; H04L 41/0806; H04L 41/28; H04L 49/15
See application file for complete search history.

(56) References Cited

U.S. PATENT DOCUMENTS

| | | | | |
|---|---|---|---|---|
| 9,838,337 | B1* | 12/2017 | Pinnamraju | ............. H04L 49/25 |
| 2005/0111455 | A1* | 5/2005 | Nozue | ................. H04L 12/4645 370/392 |
| 2006/0248159 | A1* | 11/2006 | Polan | .................. H04L 41/0273 709/208 |
| 2007/0250608 | A1* | 10/2007 | Watt | ....................... G06F 9/4401 709/222 |
| 2008/0148359 | A1* | 6/2008 | Kezys | ................. H04L 63/0428 726/4 |
| 2008/0310416 | A1* | 12/2008 | Nozue | ................. H04L 12/4645 370/392 |
| 2010/0110894 | A1* | 5/2010 | Smith | ..................... H04L 43/50 370/241 |
| 2012/0233672 | A1* | 9/2012 | Kezys | ................. H04L 63/0428 726/5 |

(Continued)

*Primary Examiner* — Brian D Nguyen
(74) *Attorney, Agent, or Firm* — Jeffrey L. Streets

(57) ABSTRACT

A method includes providing, by a network switch, a production VLAN that supports communication between a plurality of servers connected to the switch; and detecting a new physical connection of a cable between a first server and a first switch port of the switch. The method further includes automatically allocating, by the switch, a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN. An apparatus that performs the method is also provided.

20 Claims, 3 Drawing Sheets

(56) References Cited

U.S. PATENT DOCUMENTS

2014/0095680 A1\* 4/2014 Addison ............... G06F 9/5061
709/222
2017/0347269 A1\* 11/2017 Wu ....................... H04W 16/14

\* cited by examiner

PROVISIONING OF A SERVER USING A VIRTUAL LOCAL AREA NETWORK

BACKGROUND

The present disclosure relates to methods for securely provisioning a server before placing the server into a production network.

BACKGROUND OF THE RELATED ART

A datacenter or other computing system may include a large number of servers that provide services for one or more client devices. On occasion, one or more server(s) may be added to the computing system or one of the existing servers may need to be replaced or repurposed. In either of these situations, server provisioning is necessary to prepare a particular server for a particular purpose, function or role within the computing system.

During server provisioning, a server is prepared with various files and software so that the server is ready to operate in a desired manner. For example, the server may be loaded with an operating system, device drivers and various application programs. Furthermore, the server may be provided with a boot image and various parameters, such as addresses for various network resources. Once the server provisioning is complete, the server may fulfill its intended role in the computing system.

BRIEF SUMMARY

One embodiment provides a method comprising providing, by a network switch, a production VLAN (virtual local area network) that supports communication between a plurality of servers connected to the switch; and detecting a new physical connection of a cable between a first server and a first switch port of the switch. The method further comprises automatically allocating, by the switch, a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

Another embodiment provides a computer program product comprising computer readable storage media that is not a transitory signal having program instructions embodied therewith, wherein the program instructions are executable by a processor to perform a method. The method comprises providing, by a network switch, a production VLAN that supports communication between a plurality of servers connected to the switch; and detecting a new physical connection of a cable between a first server and a first switch port of the switch. The method further comprises automatically allocating, by the switch, a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

Yet another embodiment provides an apparatus comprising at least one storage device for storing program instructions, at least one processor for processing the program instructions, and a plurality of switch ports for connecting to servers, wherein the program instructions are executable by the processor to: provide a production VLAN that supports communication between a plurality of servers connected to the switch ports; detect a new physical connection of a cable between a first server and a first switch port of the switch; and automatically allocate a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

DETAILED DESCRIPTION

Figure 1:
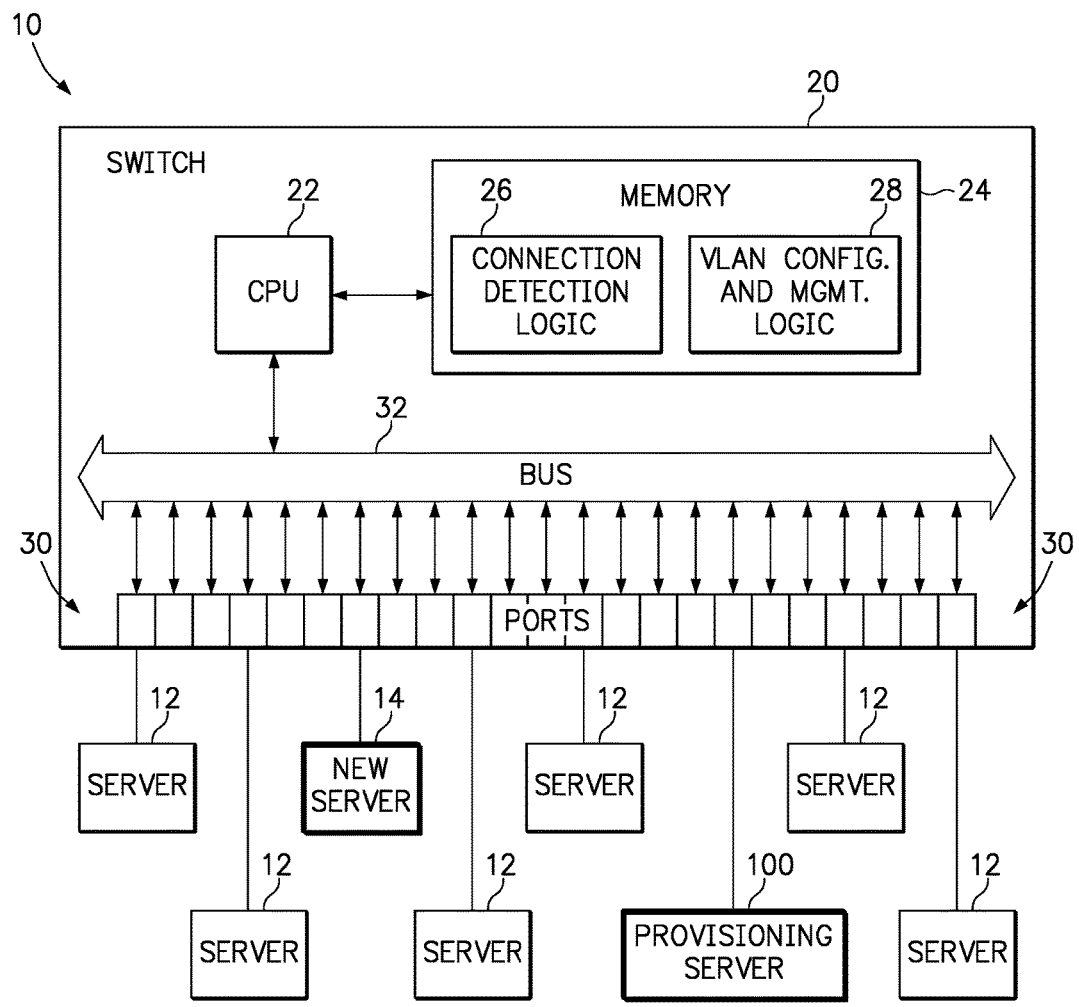
FIG. 1 is a diagram of a computing system having multiple servers connected to a network switch, including a provisioning server and a newly connected server consistent with one or more embodiments.

One embodiment provides a method comprising providing, by a network switch, a production VLAN (virtual local area network) that supports communication between a plurality of servers connected to the switch; and detecting a new physical connection of a cable between a first server and a first switch port of the switch. The method further comprises automatically allocating, by the switch, a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

A network switch is a computer networking device that is connectable to multiple computing nodes and other network switches to form a computer network. In operation, a typical network switch will receive a packet of data from one connected device (i.e., a source device), process the packet, and forward the packet to another connected device (i.e., a destination device). The computing nodes may, for example, include servers, which provide services for one or more client devices. A network switch according to various embodiments is able to configure and manage one or more virtual local area networks (VLANs). A VLAN is a logical partition that isolates one group of nodes from another group of nodes despite a physical connection through one or more switch(es). A non-limiting example of a network switch is a 50-port programmable Ethernet switch that is capable of detecting a new physical connection of a cable between a first switch port of the switch and a first server. In one option, a new physical connection is detected when the switch port receives an initial signal from the first server. Furthermore, once the first server is detected, the switch may assign a network address to the first server.

The provisioning server is a computing server that includes programming logic and files for provisioning the first server over the first provisioning VLAN. During the provisioning process, the provisioning server loads various files and parameters only to the new server, such that the new server is ready to provide desired services or functionality. For example, the files may include an operating system, device drivers and application programs, whereas the parameters may include network addresses of various resources and the like.

In one embodiment of the method, after the provisioning server has completed the provisioning of the first server, the provisioning server may provide the switch with an instruction to promote the switch port connected to the first server into the production VLAN. Accordingly, the switch may promote the first server into the production VLAN from the provisioning VLAN in response to receiving the instruction. In this manner, the first server remains isolated from the production VLAN until the first server has been fully provisioned. In a computing system having multiple production VLANs, the provisioning server may identify a particular production VLAN to which the first server should be promoted. Optionally, the provisioning process may further include one or more security measures, such as scans for a virus, spyware or malware. Still, the first provisioning VLAN may further include a security monitoring device or a network proxy server. A network proxy server may provide for limited indirect communication with the production VLAN.

In one example, the switch may promote the first server into the production VLAN by changing the configuration of the production VLAN to include the first switch port to which the first server is connected. With a programmable network switch, the reconfiguration of one or more VLAN may be controlled by program instructions. Optionally, the switch may automatically change the configuration of the first provisioning VLAN to include the first switch port in response to detecting disconnection of the cable from the first switch port. In this manner, any reconnection or new connection (i.e., a plug event) will automatically put the newly-connected server into the provisioning VLAN rather than the production VLAN. No server should be allowed to join the production VLAN unless it has been provisioned by the provisioning server or has otherwise been verified as being suitable for joining the production VLAN.

Further embodiments of the method may include the switch disabling the first switch port in response to various conditions. In one example, the switch may disable the first switch port in response to determining that the process of provisioning the first server has failed to initiate in a predetermined manner. In another example, the switch may disable the first switch port in response to detecting suspect activity on the first switch port, wherein the suspect activity may be selected from network scanning, communication with devices other than the provisioning server, and an external source communicating through the bridge to a computing node without a known purpose. In yet another example, the switch may disable the first switch port in response to the provisioning server determining that the first server is not a type of server that the provisioning server supports and the provisioning server instructing the switch to disable the first switch port or otherwise isolate or disconnect the first server.

Embodiments may include the switch providing at least one production VLAN and at least one provisioning VLAN. However, one embodiment includes the switch providing multiple provisioning VLANs including the first provisioning VLAN, and the switch selecting the first provisioning VLAN from among the multiple provisioning VLANs based upon a predetermined policy or a current load on each of the multiple provisioning VLANs. For example, the switch may determine the current load on each of the multiple provisioning VLANs and assign the first server or a subsequently connected server to the provisioning VLAN that has the least current load.

Another embodiment provides a computer program product comprising computer readable storage media that is not a transitory signal having program instructions embodied therewith, wherein the program instructions are executable by a processor to perform a method. The method comprises providing, by a network switch, a production VLAN that supports communication between a plurality of servers connected to the switch; and detecting a new physical connection of a cable between a first server and a first switch port of the switch. The method further comprises automatically allocating, by the switch, a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

The foregoing computer program product may further include program instructions for implementing or initiating any one or more aspects of the methods described herein. Accordingly, a separate description of the methods will not be duplicated in the context of a computer program product.

Yet another embodiment provides an apparatus comprising at least one storage device for storing program instructions, at least one processor for processing the program instructions, and a plurality of switch ports for connecting to servers, wherein the program instructions are executable by the processor to: provide a production VLAN that supports communication between a plurality of servers connected to the switch ports; detect a new physical connection of a cable between a first server and a first switch port of the switch; and automatically allocate a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN. The processor of the switch may include program instructions executable by the processor to implement or initiate any one or more aspects of the methods described herein.

FIG. 1 is a diagram of a computing system 10 having multiple servers 12 connected to a network switch 20, including a provisioning server 100 and a newly connected server 14 consistent with one or more embodiments. The network switch 20 is programmable, such that program instructions may be executed by the network switch to perform one or more steps of a method according to various embodiments. For example, the network switch 20 may include a central processing unit (CPU) 22 in communication with memory 24 that stores connection detection logic 26 and VLAN configuration and management logic 28. Accordingly, the CPU 22 may perform the program instructions in the connection detection logic 26 in order to detect a new physical connection of a server to one of the switch ports 30 and may perform program instruction in the VLAN configuration and management logic 28 in order to configure at least one provisioning VLAN and at least one production VLAN and management those VLANs according to an embodiment.

In the computing system 10, each of the switch ports 30 is coupled to a bus 32, although the reference to a bus is not intended to imply any specific architecture or connectivity between the ports. Incoming and outgoing communications are managed by the CPU 22 according the VLAN configuration and management logic 28. Any of the servers may only communicate with another server within the same VLAN. As shown, the multiple servers 12 may be part of a production VLAN. Conversely, in response to the connection detection logic 26 instructing the VLAN configuration and management logic 28 that a new server 14 has been detected, the VLAN configuration and management logic 28 may automatically assign the new server 14 to a first provisioning VLAN that includes the provisioning server 100. Without requiring any further connections or reconnections, the new server 14 may be provisioned by the provisioning server 100 and subsequently promoted into the production VLAN with the other servers 12.

Figure 2:
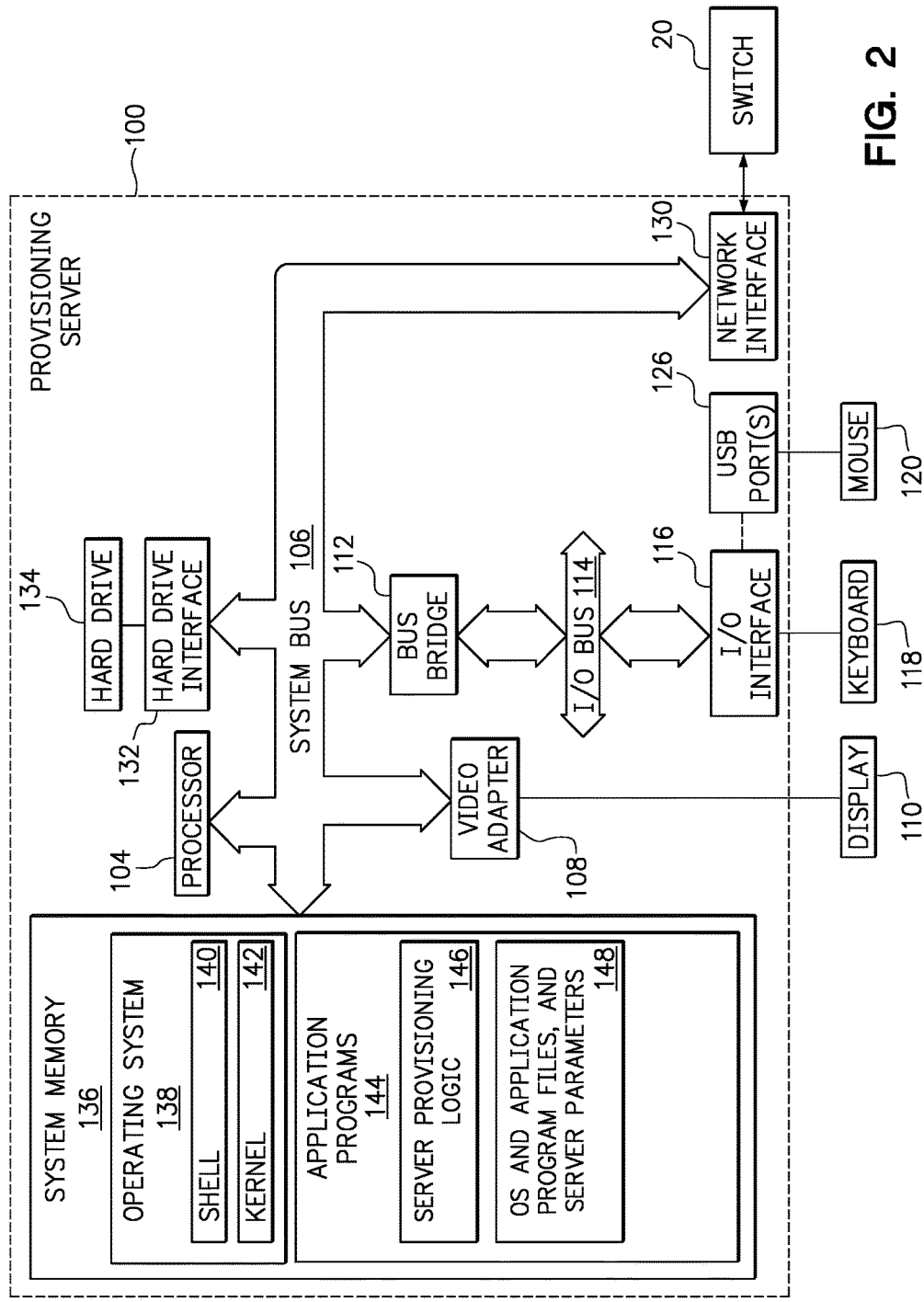
FIG. 2 is a diagram of a provisioning server according to one embodiment.

FIG. 2 is a diagram of a provisioning server 100 according to one embodiment. While the computer shown in FIG. 2 may be representative of other servers in the computing system 10 of FIG. 1, the computer will be described in the context of a provisioning server 100 according to one embodiment.

The provisioning server 100 includes a processor unit 104 that is coupled to a system bus 106. The processor unit 104 may utilize one or more processors, each of which has one or more processor cores. A video adapter 108, which drives/supports a display 110, may also be coupled to the system bus 106. The system bus 106 is coupled via a bus bridge 112 to an input/output (I/O) bus 114. An I/O interface 116 is coupled to the I/O bus 114. The I/O interface 116 affords communication with various I/O devices, such as a keyboard 118 and/or a USB mouse 120 via USB port(s) 126. As depicted, the provisioning server 100 is able to communicate with other network devices over the network 50 using a network adapter or network interface controller 130 that is connected to the switch 20.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 may include a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the embodiments may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. The operating system 138 further includes various configuration parameters 143, such as an Ethernet media access control (MAC) address, a fiber channel world-wide name (WWN), or a storage adapter parameter for providing connectivity to a storage area network (SAN).

As shown, the provisioning server 100 includes application programs 144 stored in the system memory of the computer 100. As shown, the application programs 144 include server provisioning logic 146 and OS and application program files, and server parameters 148. Accordingly, the provisioning server 100 includes the logic and files needed to provision a server that has joined the provisioning VLAN.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the disclosed embodiments.

Figure 3:
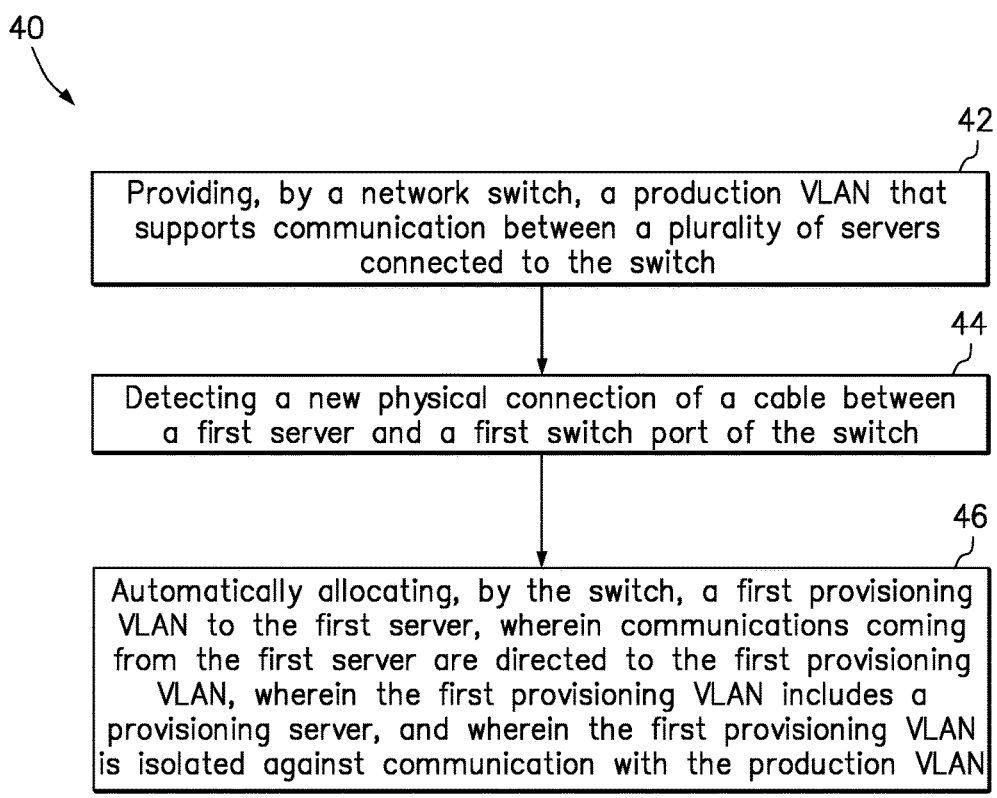
FIG. 3 is a flowchart of a method according to an embodiment.

FIG. 3 is a flowchart of a method 40 according to an embodiment. Step 42 includes providing, by a network switch, a production VLAN that supports communication between a plurality of servers connected to the switch. Step 44 includes detecting a new physical connection of a cable between a first server and a first switch port of the switch. Step 46 includes automatically allocating, by the switch, a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
providing, by a network switch, a production VLAN that supports communication between a plurality of servers connected to the switch;
detecting a new physical connection of a cable between a first server and a first switch port of the switch; and
automatically allocating, by the switch, a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

2. The method of claim 1, further comprising:
receiving a message from the provisioning server indicating that the provisioning server has completed the provisioning of the first server.

3. The method of claim 2, further comprising:
promoting, by the switch, the first server into the production VLAN in response to receiving the message.

4. The method of claim 3, wherein the switch promotes the first server into the production VLAN by changing the configuration of the production VLAN to include the first switch port to which the first server is connected.

5. The method of claim 4, further comprising:
automatically changing, by the switch, the configuration of the first provisioning VLAN to include the first switch port in response to detecting disconnection of the cable from the first switch port.

6. The method of claim 1, further comprising:
disabling, by the switch, the first switch port in response to determining that provisioning of the first server has failed to initiate in a predetermined manner.

7. The method of claim 1, further comprising:
providing, by the switch, multiple provisioning VLANs including the first provisioning VLAN; and
selecting, by the switch, the first provisioning VLAN from among the multiple provisioning VLANs based upon a predetermined policy or a current load on each of the multiple provisioning VLANs.

8. The method of claim 1, wherein the first provisioning VLAN further includes a security monitoring device or a network proxy server.

9. The method of claim 1, wherein the first provisioning VLAN further includes a network proxy server that has limited communication with the production VLAN.

10. The method of claim 1, further comprising:
detecting, by the switch, suspect activity on the first switch port, wherein the suspect activity is selected from network scanning, communication with devices other than the provisioning server, and an external source communicating through the switch to an endpoint without authorization; and
disabling, by the switch, the first switch port in response to detecting the suspect activity.

11. The method of claim 1, further comprising:
receiving, by the switch, an instruction from the provisioning server to isolate or disconnect the first server in response to the provisioning server determining that the first server is not a type of server that the provisioning server supports.

12. The method of claim 2, wherein the provisioning server provisioning the first server over the first provisioning VLAN, includes the provisioning server loading one or more files onto the first server, wherein the one or more files are selected from an operating system, a device driver, an application program, and combinations thereof.

13. A computer program product comprising computer readable storage media that is not a transitory signal having program instructions embodied therewith, the program instructions executable by a processor to:
provide, by a network switch, a production VLAN that supports communication between a plurality of servers connected to the switch;
detect a new physical connection of a cable between a first server and a first switch port of the switch; and
automatically allocate, by the switch, a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

14. The computer program product of claim 13, the program instructions further executable by the processor to:
receive a message from the provisioning server indicating the that the provisioning server has completed the provisioning of the first server; and
promote, by the switch, the first server into the production VLAN in response to receiving the message.

15. The computer program product of claim 14, wherein the switch promotes the first server into the production VLAN by changing the configuration of the production VLAN to include the first switch port to which the first server is connected.

16. The computer program product of claim 15, the program instructions further executable by the processor to:
automatically change, by the switch, the configuration of the first provisioning VLAN to include the first switch port in response to detecting disconnection of the cable from the first switch port.

17. An apparatus, comprising:
at least one storage device for storing program instructions;
at least one processor for processing the program instructions; and
a plurality of switch ports for connecting to servers, wherein the program instructions are executable by the processor to:
provide a production VLAN that supports communication between a plurality of servers connected to the switch ports;
detect a new physical connection of a cable between a first server and a first switch port of the switch; and
automatically allocate a first provisioning VLAN to the first server, wherein communications coming from the first server are directed to the first provisioning VLAN, wherein the first provisioning VLAN includes a provisioning server, and wherein the first provisioning VLAN is isolated against communication with the production VLAN.

18. The apparatus of claim 17, wherein the program instructions are further executable by the processor to:
promote the first server into the production VLAN in response to the provisioning server having completed the provisioning of the first server.

19. The apparatus of claim 18, wherein the program instructions are further executable by the processor to:
automatically change the configuration of the first provisioning VLAN to include the first switch port in response to detecting disconnection of the cable from the first switch port.

20. The apparatus of claim 18, wherein the program instructions are further executable by the processor to:
disable the first switch port in response to determining that provisioning of the first server has failed to initiate in a predetermined manner.

* * * * *